United States Patent [19]

Deiner

[11] 3,887,390
[45] June 3, 1975

[54] CONCENTRATED STABLE AQUEOUS EMULSIONS OF WATER-REPELLENT AGENTS AND PROCESS FOR MAKING THEM

[75] Inventor: Hans Deiner, Hainhofen, Germany

[73] Assignee: Ciba-Geigy AG, Basel, Switzerland

[22] Filed: Aug. 13, 1973

[21] Appl. No.: 387,877

[30] Foreign Application Priority Data
Aug. 18, 1972  Germany............................ 2240597

[52] U.S. Cl. ................ 106/271; 117/142; 117/158; 117/167; 117/168
[51] Int. Cl............................................. C08h 9/06
[58] Field of Search ......... 106/271; 117/158, 135.5, 117/139.5 CF

[56] References Cited
UNITED STATES PATENTS

| | | | |
|---|---|---|---|
| 2,273,040 | 2/1942 | Iler............................... | 117/138.8 B |
| 2,356,161 | 8/1944 | Iler................................ | 117/121 |
| 2,402,351 | 6/1946 | Smith................................ | 106/271 |
| 2,683,156 | | Iler.................................. | 106/287 |
| 2,737,458 | 3/1956 | Burnham............................ | 106/271 |
| 2,774,689 | 12/1956 | Orthner............................. | 106/271 |
| 3,157,661 | 11/1964 | Gray.................................. | 106/271 |
| 3,379,709 | 4/1968 | Louden.............................. | 117/158 |
| 3,486,911 | 12/1969 | Goldstein........................... | 106/271 |
| 3,490,925 | 1/1970 | Blomfield......................... | 117/135.5 |
| 3,651,105 | 3/1972 | Anello............................. | 117/135.5 |

*Primary Examiner*—Joseph L. Schofer
*Assistant Examiner*—P. R. Michl
*Attorney, Agent, or Firm*—Joseph G. Kolodny; Edward McC. Roberts; Prabodh I. Almaula

[57] ABSTRACT

The invention relates to concentrated aqueous emulsions of water-repellent agents. The emulsions according to the invention contain Werner type chromium complex salts and emulsified paraffin in quantities of 800 to 4000 grams per g-atom of chromium. Higher molecular weight carboxylic acid groups, such as stearic or montanic acid groups, are present in the emulsion in a molar ratio of chromium to higher molecular weight carboxylic acid groups of 1:0.55 to 1:2. Preferred emulsions contain chromium complexes having basicities of more than 15%. The emulsions are stable and can be stored prior to use.

18 Claims, No Drawings

CONCENTRATED STABLE AQUEOUS EMULSIONS OF WATER-REPELLENT AGENTS AND PROCESS FOR MAKING THEM

This invention relates to concentrated stable aqueous emulsions of a water-repellent agent which remains stable during storage. The invention also relates to a method of producing the emulsion.

For making fibrous materials water-repellent, Werner type chromium complexes containing organic acid groups, mixed with conventional paraffin emulsions in aqueous solution have been used. These agents thus exist as two-component systems, the separate constituents of which have to be mixed before use. This is clearly disadvantageous. In addition, the effects obtained with these mixtures are not satsifactory in all cases.

It has now been found that the disadvantages of the above-mentioned mixtures can be overcome according to the invention by employing emulsions of water-repellent agents based on Werner type chromium salts containing organic acid groups, which have a solids content of more than 15%, more particularly 20 to 40%, based on the total weight of the emulsion, a molar ratio of chromium to higher molecular weight carboxylic acid groups present in the emulsion of 1:0.55 to 1:2, more particularly 1:0.6 to 1:1.3, and an amount of paraffin of from 800 to 4,000 g, more particularly 1,000 to 3,000 g, for each g-atom of chromium. Preferred are those water-repellent agent emulsions which have been produced by using a chromium complex with a basicity of above 15%, more particularly 25 to 40%.

According to another aspect of the invention there is provided a process for preparing a concentrated stable aqueous emulsion of a water-repellent agent, based on a Werner type chromium complex salt having organic acid groups in which there are emulsified in an aqueous-alcoholic solution of a Werner type chromium complex salt having 0.7 to 1 higher molecular weight carboxylic acid groups, 800 to 4,000 grams of paraffin per g-atom of chromium and such a quantity of a higher molecular weight carboxylic acid that the total number of acid groups per chromium atom is 0.55 to 2.0, the emulsification being effected at a temperature above the melting point of the paraffin, and the alcohol in the above solution being a lower aliphatic alcohol and being present in an amount of from 150 to 350% based on the weight of the chromium complex.

The Werner type chromium complex salts which are used are known (see Hermann Rath, "Lehrbuch der Textilchemie", 2nd edition, 1963, page 112). The production of these complex salts and the alcoholic solutions thereof is, for example, disclosed in U.S. Pat. Nos. 2,273,040, 2,356,161 and in German Pat. No. 973,270.

The water-repellent agent emulsions according to the invention can be produced by using those chromium complexes which contain 0.7 to 1 acid groups of a higher molecular weight carboxylic acid, more particularly of a fatty acid with more than 12 carbon atoms, such as palmitic acid, stearic acid, behenic acid or cerotic acid. The chromium complex salts are in this case formed as alcoholic/aqueous solutions, which contain 150 to 350%, based on the weight of the chromium complex, of a lower aliphatic alcohol, more particularly isopropanol.

The basicity of the chromium complex salts used according to the invention, based on the introduced chromium salt, should amount in this case to more than 15%, preferably 25 to 40%. As described in U.S. Pat. No. 2,356,161, basicity means the partial replacement of the chlorine atoms by OH groups, i.e., when a chlorine atom is replaced by the OH group, the basicity is 33% (see page 4, middle of left-hand column).

The emulsions of water-repellent agents according to the invention contain normal commercial paraffin. Preferably paraffin having a melting point of from 52° to 58°C is emulsified. The amount of paraffin in the concentrated aqueous emulsions is 800 to 4,000 g, preferably 1,000 to 3,000 g per g-atom of chromium.

The higher molecular weight carboxylic acids added during the emulsification preferably have more than 12 carbon atoms, as do the acid groups in the chromium complex salts. Examples are palmitic acid, stearic acid, oleic acid, behenic acid and montanic acid, which can be used in technical quality. Technical stearic acid and montanic acid are preferred. During the emulsification, such quantities of these higher molecular weight carboxylic acids are added that 0.55 to 2.0 and preferably 0.6 to 1.3 organic acid groups per chromium atom are contained in the resulting emulsion of water-repellent agents. Naturally, mixtures of these acids can also be used.

The production of the emulsions of the invention is carried out by using Werner type chromium complex salts, which are produced in alcoholic/aqueous solution after dilution with water and heating to temperatures above the melting point of the paraffin, i.e., usually to 60° to 70°C. The paraffin which has been melted together with the higher molecular weight carboxylic acid, is introduced into this solution while stirring vigorously. When operating in this way, care should be taken that the temperature does not fall below the melting point of the paraffin. Thereafter, the preliminary emulsion obtained is subjected at 150 to 350 at to a high-pressure homogenisation. During this homogenisation the temperature reaches about 60° to 65°C. In principle, it is possible to start the homogenisation at this temperature and to allow the latter to fall to about 35° to 40°C while the machine is running.

It is in addition also possible to produce the water-repellent agent emulsions by dissolving the higher molecular weight fatty acids in the alcoholic-aqueous chromium complex salt solution, heating this solution to 60° to 70°C, diluting it with water and then introducing the molten paraffin and completing the operation as described. It is naturally also possible for the chromium complex salt solution to be initially heated, the higher molecular weight carboxylic acid stirred in, the mixture diluted with water, and the molten paraffin introduced into this solution, whereafter the emulsions of the water-repellent agents are prepared in the manner described.

Another but less suitable method of production involves boiling the chromium salt solution under reflux together with the higher molecular weight carboxylic acid, and then producing the stable emulsion in the manner described, by diluting with water, adjusting the temperature to 60° to 70°C, stirring in the molten paraffin and high-pressure homogenising.

The emulsions of water-repellent agents are adjusted to a solids content of more than 15%, preferably 20 to 40%, based on the total weight of the emulsion. It is particularly preferred that the emulsions which are produced by addition of montanic acid are brought to a content of 20 to 25% of solids, and the emulsions produced by addition of the other higher carboxylic acids, to a content of 25 to 40% of solids.

The emulsions produced in this way are usually obtained as rather acid products with a pH value of less than 2. Should it be necessary, for example, to avoid excessive damage of textile fibres, the emulsions of the water-repellent agents can be brought to higher pH values, and preferably 3 to 4, by adding buffering agents, e.g., dicyandiamide, urea or sodium acetate.

The emulsions obtained are characterised by finely divided nature and hence great stability. They can be diluted with water in any desired ratio. As compared with the known water-repellent agents, with which Werner type chromium complexes and conventional paraffin emulsions are used in aqueous solution, and which have to be mixed in dilute form only immediately before being used, the water-repellent agent emulsions according to the invention have the advantage that they can be employed immediately, i.e., no additional working steps are necessary when preparing the bath liquors. In addition, the water-repellent agent emulsions according to the invention are distinguished by the fact that when used in extremely small quantities, they produce excellent water-proofing and water-repelling effects.

The concentrated, storable, aqueous water-repellent agent emulsions according to the invention, after dilution with water (about 30 to 50 g per litre), can be used for making a wide variety of materials water repellent; such materials include textiles, paper and leather. These emulsions are particularly suitable for the water-repellent finishing of textiles, particularly textiles consisting of synthetic fibres, such as polyacrylonitrile, polyester or polyamide and textiles consisting at least in part of cellulose fibres.

The emulsions can naturally be combined with other agents, such as those used for improving the properties of the materials to be treated. With the water-repellent treatment of textiles, the addition of conventional synthetic resins, which are used for producing crease resistance, and the corresponding hardeners, play an important part.

The emulsions according to the invention can only be produced if higher molecular weight carboxylic acids are emulsified together with the paraffin or are dissolved prior to the emulsification of the latter. In this way, water-repellent agents are formed which then provide the desired good impregnation effects. In fact, if the paraffin is emulsified in the same way but without concurrent use of fatty acid, stable emulsions are likewise formed, but these provide substantially less favourable water-repellent effects, and in fact only impregnating effects, which are even sometimes below the level of the zirconium-paraffin emulsions.

The invention will now be illustrated with reference to the following Examples.

EXAMPLE 1

160 g of the chromium complex solution prepared as hereinafter described were dissolved in 536 g of water, and the solution was heated to 65°C. A melt consisting of 272 g of paraffin 58/60 (melting point 58° to 60°C) and 32 g of montanic acid (acid number about 140) was allowed to run into this solution while stirring vigorously. Thereafter, the preliminary emulsion obtained was homogenised under high pressure for 20 minutes at about 250 at, the temperature being kept at about 60°C. After cooling, the emulsion was diluted to 25% by adding water. A finely divided emulsion of water-repelling agents with extremely good stability in storage was obtained. This emulsion could be further diluted with water in any proportion.

The solution of the chromium complex salt was prepared as follows: 53.4 g of $CrCl_3 \cdot 6 H_2O$ were dissolved in 100 g of isopropanol and, after adding 30.6 g of sodium stearate, boiled for 90 minutes under reflux, 4 g of NaOH, dissolved in 6 g of water, were then added to the still hot solution and boiling under reflux was effected for another 30 minutes. The solution was thereafter cooled and the precipitated sodium chloride separated by filtering.

A cotton poplin (weight per square metre about 150 g) was impregnated with this emulsion using 50 g per litre. The material was then squeezed out to about 70% solution absorption and dried for about 10 minutes at 110°C. The fabric showed a water absorption of only 9% and an excellent water-repellent effect (established according to DIN 53 888).

Treatment of the same poplin under the same conditions in accordance with the prior art, the finishing solution being used containing 50 g per litre of a normal commercial zirconium-paraffin emulsion (again 27% of paraffin) and 10 g per litre of the chromium complex salt solution prepared as described, produced a water absorption of 24%. The water-proofing, determined by the water-repellent effect, was extremely low.

EXAMPLE 2

80 g of a 30% solution of stearato-chromium (III)-chloride in isopropanol (basicity 35%), after being diluted with 616 g of water, was heated to 60°C, and a melt consisting of 272 g of paraffin 52/54 and 32 g of montanic acid (acid number about 138) added while stirring vigorously. The emulsion was thereafter prepared by high pressure homogenisation (about 230 at) at the said temperature (duration about 30 minutes). The emulsion was adjusted by addition of water to a solid content of 24%. The emulsion was extremely stable and suitable for making fibrous materials water-repellent.

Dissolution of the chromium complex salt solution in 738 g of water and, use of an otherwise similar working procedure and only 150 g of paraffin produced a stable emulsion of water-repellent agents, which showed at the outset a solid content of only about 20%.

EXAMPLE 3

In 246 g of a 30% chromium complex salt solution (acid group = 16 carbon atoms; basicity 30%) in propanol and some water, were dissolved 20 g of technical stearic acid (acid number about 205). The solution was heated to 68°C, diluted with 442 g of water, and a melt of 272 g of paraffin 58/60 added thereto while stirring vigorously. A high-pressure homogenisation (25 minutes at 280 at), was effected during which homogenisation the temperature fell from 65° to 42°C, and a storable emulsion of water-repellent agents was obtained, which could be diluted in any proportion with water.

A stable emulsion was obtained under similar conditions by adding a melt of 350 g of paraffin 58/60 (with a correspondingly reduced quantity of water at the time of diluting the chromium complex salt solution).

EXAMPLE 4

126 g of 30% chromium complex salt solution (acid group = 22 carbon atoms; basicity 28%) were diluted with 570 g of water and, as described in Example 2, a melt of 284 g of paraffin 58/60 and 20 g of oleic acid was stirred in. Homogenisation under high pressure then took place for 15 minutes at 260 at (temperature 60°C). The emulsion obtained was of a very finely divided form and stable in storage.

An equally stable, finely divided water-repellent agent emulsion was likewise obtained by using 42 g of palmitic acid instead of 20 g of oleic acid, melting thus together with the paraffin and incorporating it by emulsification.

EXAMPLE 5

125 g of the chromium complex salt solution described in Example 1 were diluted with 587 g of water. The solution obtained was heated to 58°C and and a melt of 245 g of paraffin 52/54 and 43 g of montanic acid (acid number about 135) was emulsified while stirring vigorously at this temperature. Thereafter, still at the same temperature, high-pressure homogenisation takes place in known manner for 20 minutes at 300 at and, after dilution with water, a storable 20% hydrophobing agent emulsion is obtained, which can readily be further diluted with water and, in this form, is excellently suitable for the hydrophobing of particularly cellulose-containing textiles.

EXAMPLE 6

160 g of the chromium complex salt solution prepared as indicated below were heated to 70°C and 40 g of montanic acid were added while stirring. Dilution with 530 g of water was then effected, and the solution again heated to 70°C, 270 g of molten paraffin 50/52 were then added while stirring vigorously. The preliminary emulsion obtained was then subjected to high pressure homogenisation for 20 minutes, the temperature dropping to about 45°C. The emulsion of water-repellent agents thus obtained was diluted with water to 22% and was found to have the good properties indicated in the preceding example.

The chromium complex salt solution was prepared in the following way:

70 g of $CrCl_3 \cdot 6 H_2O$ were dissolved in 130 g of isopropanol and, after adding 30.6 g of sodium stearate, boiled under reflux for 90 minutes. 18.0 g of 45% sodium hydroxide solution were introduced dropwise into the hot solution while stirring. Thereafter, the solution was again boiled for 30 minutes under reflux, and the precipitated common salt filtered off. Cooling then took place.

EXAMPLE 7

125 g of an approximately 30% chromium complex salt solution (prepared, as in the previous example, from 53.6 of $CrCl_3 \cdot 6 H_2O$, 100 g of isopropanol, 30.6 g of sodium stearate and 3.3 g of 45% aqueous sodium hydroxide solution) were diluted with 505 g of water. The solution obtained was heated to about 62°C. A melt consisting of 360 g of soft paraffin and 10 g of behenic acid was added to the warm solution while stirring vigorously. Thereafter, at the same temperature, high-pressure homogenisation took place in the usual manner for 20 minutes at about 250 at. The water-repellent agent emulsion obtained was stable and could be diluted in any proportion with water.

Instead of the behenic acid 11.5g of technical stearic acid could be used.

We claim:

1. A concentrated stable aqueous emulsion of a water-repellent agent comprising a Werner type chromium complex salt of a higher molecular weight fatty carboxylic acid, the molar ratio of chromium to fatty acid present in the emulsion being in the range of 1:0.55 to 1:2, and emulsified paraffin in an amount of 800 to 4,000 grams per g-atom of chromium, wherein the solids content of the emulsion is greater than 15%, based on the weight of the emulsion.

2. An emulsion of claim 1, wherein the chromium complex has a basicity of 25 to 40%.

3. An emulsion of claim 1, wherein the molar ratio of chromium to the higher molecular weight carboxylic acid is 1:0.6 to 1:1.3.

4. An emulsion of claim 1, wherein the paraffin amount is 1,000 to 3,000 grams per g-atom of chromium.

5. An emulsion of claim 1, wherein the solids content is 20 to 40%, related to the total weight of the emulsion.

6. An emulsion of claim 1, wherein the carboxylic acid groups contain more than 12 carbon atoms.

7. A process for preparing a concentrated stable aqueous emulsion of a water-repellent agent based on a Werner type chromium complex salt having organic acid groups comprising emulsifying in an aqueous-alcoholic solution of a Werner type chromium complex salt having 0.7 to 1 higher molecular weight carboxylic acid groups, 800 to 4,000 grams of paraffin per g-atom of chromium and such a quantity of a higher molecular weight carboxylic acid that the total number of acid groups per chromium atom is 0.55 to 2.0, the emulsification being effected at a temperature above the melting point of the paraffin, and the alcohol in the above solution being a lower aliphatic alcohol and being present in an amount of from 150 to 350% based on the weight of the chromium complex.

8. A process of claim 7, wherein the fatty carboxylic acid is of more than 12 carbon atoms.

9. A process of claim 7, wherein the alcohol is isopropanol.

10. A process of claim 7, wherein the chromium complex has a basicity from 25 to 40%.

11. A process of claim 7, wherein the total quantity of fatty carboxylic acid groups per chromium atom is 0.6 to 1.3.

12. A process of claim 7, wherein 1,000 to 3,000 g of paraffin per g-atom of chromium are emulsified.

13. A process of claim 7, wherein the emulsion has a solids content of 15 to 50%.

14. A process of claim 13, wherein the emulsion has a solids content of 20 to 40%.

15. A process for preparing a concentrated stable aqueous emulsion of a water-repellent agent based on a Werner type chromium complex salt having carboxylic acid groups, comprising emulsifying 800 to 4,000 grams of paraffin, per g-atom of chromium in an aqueous-alcoholic solution containing dissolved therein a Werner type chromium complex salt having 0.7 to 1 higher molecular weight carboxylic acid groups and such a quantity of a higher molecular weight carboxylic acid, that the total number of acid groups in the solution per chromium atom is 0.55 to 2.0, the emulsification being effected at a temperature above the melting point of the paraffin, and the alcohol in the above solution being a lower aliphatic alcohol present in an amount of from 150 to 350% based on the weight of the chromium complex.

16. A process of claim 15, wherein the fatty acid is one of more than 12 carbon atoms.

17. A process of claim 15, wherein the alcohol is isopropanol.

18. The emulsion of claim 1, wherein the fatty acid is stearic acid or montanic acid.

* * * * *